S. PETTY.
Saw-Clamp.

No. 221,470.　　　　　Patented Nov. 11, 1879.

Witnesses
D. B. Lawler
H. M. Chace

Inventor
Solomon Petty
per J. L. Boone
Attorney

UNITED STATES PATENT OFFICE.

SOLOMON PETTY, OF VOLCANO, CALIFORNIA.

IMPROVEMENT IN SAW-CLAMPS.

Specification forming part of Letters Patent No. 221,470, dated November 11, 1879; application filed November 29, 1878.

*To all whom it may concern:*

Be it known that I, SOLOMON PETTY, of Volcano, county of Amador, State of California, have invented an Improved Saw Clamp and Set; and I do hereby declare that the following is a full, clear, and exact description thereof, reference being had to certain drawings accompanying this specification and forming a part of the same.

My invention consists of an anvil and clamping-lever, which are arranged to hold the saw between them while the teeth are being set with a punch and hammer. The edges of the anvil are beveled, and the saw is held so that its teeth project over one of the beveled edges. A stroke with the hammer and punch upon each alternate tooth then sets it to correspond with the bevel on the anvil.

Figure 1:
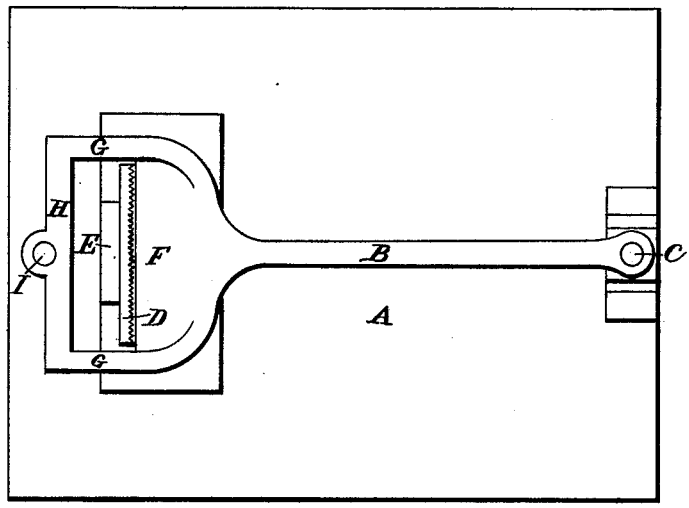
Figure 2:
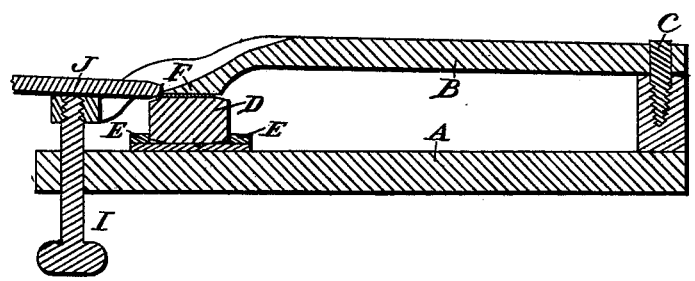

Referring to the accompanying drawings, Figure 1 is a plan view. Fig. 2 is a longitudinal section.

Let A represent the base of the saw-set. B is the clamping-lever, one end of which is secured by a screw, C, to one end of the base, so that the opposite or clamping end of the lever can be swung around on the screw as a center; or a hinge-joint might be used, so that the lever, instead of swinging horizontally, could be raised vertically; or any other simple fastening could be used as a fulcrum.

The anvil D is simply a square or other shaped block of steel or iron, with its edges slightly beveled, as shown at Fig. 2. This anvil or block of metal is arranged to fit in a recess or bed, which is made in or secured upon the bed-piece or base A near the end opposite that to which the lever is attached. In the present instance I have represented ledges or bars E secured to the bed-piece so as to form the recess in which the anvil fits.

The lever B is made broad at or near its outer end, where it rests upon the anvil, so as to form a pressure-plate, F. The under side of this pressure-plate is made flat, so as to rest squarely down upon the anvil with its outer broad edge bearing upon the block or anvil just behind the bevel. An arm, G, extends outward from each corner of the broad edge of the plate F in line with the sides of the plate, and the ends of these arms are connected by a cross-bar, H, which is parallel with the edge of the plate. In the middle of this cross-bar is a screw-hole. A thumb-screw, I, passes up through the base A, and is screwed into this hole, so that by turning the screw in one direction the outer end of the lever is drawn down, and the pressure-plate is drawn firmly upon the block or anvil D.

The outer edge of the pressure-plate is beveled off to an edge, so as not to interfere with the operation of the punch in setting the teeth of the saw.

The screw I being loosened so that the outer end of the lever which forms the pressure-plate can be raised, the saw to be set is inserted under the pressure-plate and placed upon the anvil with its teeth projecting out over the bevel. The screw is then turned so as to draw the plate down firmly upon the saw and clamp it upon the anvil. The operator then takes a punch, J, and hammer and sets each alternate tooth by striking upon it, so as to bend it down against the beveled edge of the anvil. The screw I is then loosened and the saw reversed, and the same operation proceeded with on the alternate teeth, thus setting the saw to a perfect gage, as the set of all the teeth must be uniform if the bevel is uniform.

The pressure-plate F might be made separate from the lever and the lever arranged to pass over it and clamp it down upon the saw; but I prefer to combine them in one piece.

A bevel can be made on each of the four edges of the anvil, and each bevel can be of a different pitch, so that one anvil will answer for several gages of saws.

This device is extremely simple and very convenient. It enables any person that can handle a hammer and punch to set his own saw with perfect regularity.

It will be observed that while the clamp F is adapted to rest on the anvil, or rather on the interposed saw-blade to be operated on, its forwardly-projecting cross-bar H, in addition to being adapted to be secured so as to hold the clamp on the saw-blade, also forms a rest or support for the outer end or portion of the setting tool or punch, its upper edge being arranged on the same plane with the lower or under surface of the clamp F, as clearly seen in Fig. 2.

I am aware that a patent was granted August 12, 1833, to William Hinds for a saw-set, showing a form of device somewhat like my invention, but not the same construction, and I desire to disclaim the invention shown in said patent.

What I claim as new and my invention is—

In a saw clamp and set, the clamp or plate F, having an arm, B, hinged or pivoted to a suitable support, A, and provided with a forward cross-bar, H, connected to said clamp by arms G, and having its upper surface on the same plane with the under surface of the clamp, in combination with the anvil D, seated by a socketed plate, E, on the support A, and having beveled edges, and holding and adjusting screw I, substantially as shown and described.

In witness whereof I have hereunto set my hand and seal.

SOLOMON PETTY. [L. S.]

Witnesses:
L. McLAINE,
ROBERT STEWART.